United States Patent
Giese et al.

(10) Patent No.: US 9,248,382 B2
(45) Date of Patent: Feb. 2, 2016

(54) COLUMN FOR CARRYING OUT GAS/LIQUID MASS-TRANSFER PROCESSES

(71) Applicant: BASF SE, Ludwigshafen (DE)

(72) Inventors: Reiner Giese, Dannenfels (DE); Egon Schmidt, Homburg (DE)

(73) Assignee: BASF SE, Ludwigshafen (DE)

( * ) Notice: Subject to any disclaimer, the term of this patent is extended or adjusted under 35 U.S.C. 154(b) by 157 days.

(21) Appl. No.: 14/187,460

(22) Filed: Feb. 24, 2014

(65) Prior Publication Data

US 2014/0252663 A1    Sep. 11, 2014

Related U.S. Application Data

(60) Provisional application No. 61/774,628, filed on Mar. 8, 2013.

(51) Int. Cl.
*B01D 3/32* (2006.01)
*B01D 3/30* (2006.01)
*B01D 3/16* (2006.01)

(52) U.S. Cl.
CPC . *B01D 3/30* (2013.01); *B01D 3/163* (2013.01)

(58) Field of Classification Search
CPC ........... B01D 3/163; B01D 3/30; B01D 3/324
USPC ................................ 261/44.1, 83, 113, 114.5
See application file for complete search history.

(56) References Cited

U.S. PATENT DOCUMENTS 2,561,669 A * 7/1951 Macq ........................ B01D 3/30
                                                          261/81
2,698,287 A * 12/1954 Bowden .................... B01D 3/30
                                                          159/11.3

(Continued)

FOREIGN PATENT DOCUMENTS

DE    39 26 974 A1    2/1991
EP    2 027 901 A1    2/2009

(Continued)

OTHER PUBLICATIONS

International Search Report issued May 27, 2014 in PCT/EP2014/054412 with English Translation of Category of Cited Documents.

*Primary Examiner* — Charles Bushey
(74) *Attorney, Agent, or Firm* — Oblon, McCleland, Maier & Neustadt, L.L.P.

(57) ABSTRACT

The invention relates to a column for carrying out gas/liquid mass-transfer processes, wherein, in the column (27), at least one lock (15) bordered by an upper separating tray (17) and a lower separating tray (19) is received, which lock is designed in such a manner that, during the mass-transfer process, gas (23) flows through the lock (15) and a liquid (25) situated on the upper separating tray (17), when the gas supply is interrupted the liquid (25) flows into the lock (15) onto the lower separating tray (19) and when the gas supply is renewed, the liquid (25) drains downward out of the lock (15). The lower separating tray (19) has a tray (1) that can be mounted so as to be fixed and has at least one opening (3), and a rotatable tray (13) which is connected to a rotatable axle (21) that is conducted through the tray (1) that can be mounted so as to be fixed, in such a manner that the rotatable tray (13) can be turned in relation to the tray (1) that can be mounted so as to be fixed, wherein the rotatable tray (13) of the lower separating tray (19) is designed in such a manner that the at least one opening (3) in the tray (1) that can be mounted so as to be fixed is closed in a first position of the rotatable tray (13) and can be opened by turning the rotatable tray (13).

11 Claims, 4 Drawing Sheets

(56) References Cited

U.S. PATENT DOCUMENTS

| | | | | |
|---|---|---|---|---|
| 3,685,811 | A | * | 8/1972 | Heckmann ............ B01D 3/163 261/114.1 |
| 3,942,951 | A | | 3/1976 | Atoiants et al. |
| 8,158,073 | B2 | * | 4/2012 | Maleta ................... B01D 3/163 261/108 |
| 8,333,940 | B2 | * | 12/2012 | Maleta ................... B01D 3/163 202/158 |
| 2009/0145738 | A1 | * | 6/2009 | Maleta ................... B01D 3/163 202/258 |
| 2009/0200690 | A1 | | 8/2009 | Maleta et al. |
| 2014/0251138 | A1 | * | 9/2014 | Giese ..................... B01D 3/163 95/242 |
| 2014/0252661 | A1 | * | 9/2014 | Giese ..................... B01D 3/163 261/62 |

FOREIGN PATENT DOCUMENTS

| | | |
|---|---|---|
| EP | 2 033 698 A1 | 3/2009 |
| RU | 2 237 508 C1 | 10/2004 |

\* cited by examiner

COLUMN FOR CARRYING OUT GAS/LIQUID MASS-TRANSFER PROCESSES

The invention relates to a column for carrying out gas/liquid mass-transfer processes, wherein, in the column, at least one lock is received which is designed in such a manner that, during the mass-transfer process, gas flows through the lock and a liquid situated on the upper separating tray, when the gas supply is interrupted the liquid flows into the lock onto the lower separating tray and when the gas supply is renewed, the liquid drains downward out of the lock.

By way of the use of the lock, into which the liquid runs when the gas supply is interrupted, what is termed a "cyclic distillation" may be carried out, that has the advantage that there is no back mixing owing to liquid draining off from a tray. All of the liquid always drains from one tray while the mass-transfer process is interrupted owing to interruption of the gas supply. The efficiency of the mass-transfer process can be increased thereby.

Corresponding columns can be used in all mass-transfer processes in which a gas flows through a liquid. These are, for example, distillations, rectifications, or else chemical reactions.

A column for carrying out mass-transfer processes which comprises at least one lock which is bordered by an upper and lower separating tray is known, for example, from EP 2 033 698 A1, EP 2 027 901 A1 or RU 2 237 508 C1. The locks described here comprise an upper and a lower separating tray each of which has valves which are designed in such a manner that a gas can flow through the separating tray and, when the gas flow is interrupted, liquid flows from the upper tray into the lock and when the gas supply is renewed, can flow from the lock onto the separating tray therebeneath. The valves disclosed in these documents comprise in each case a closing element that comprises two valve disks that are connected to one another by means of a spacer rib. In a first position of the closing element, an outlet opening from the valve is closed by the lower valve disk, through which outlet opening liquid from the lower tray can flow out onto the separating tray therebeneath. At the same time, the second valve disk is in a position which permits flow of the liquid from the upper tray into the lock. In a second position, the closing element is lifted in such a manner that gas can first flow into the lock through the lower opening in the valve and then can flow around the lower valve disk through openings in the valve casing through the lock in the direction of the upper tray, wherein the gas on the upper tray is passed through the liquid standing on the tray.

A disadvantage of the methods known from the prior art is that the valves can block, and so the liquid does not flow out of the lock when the gas supply is renewed, or an excessive gas pressure is necessary in order to open the valve. This can lead to an impairment in separation efficiency.

The object of the invention is therefore to provide a column for carrying out mass-transfer processes which does not have the disadvantages known from the prior art, in particular in which column blocking of the valves can be avoided.

The object is achieved by a column for carrying out gas/liquid mass-transfer processes, wherein, in the column, at least one lock bordered by an upper separating tray and a lower separating tray is received, which lock is designed in such a manner that, during the mass-transfer process, gas flows through the lock and a liquid situated on the upper separating tray, when the gas supply is interrupted the liquid flows into the lock onto the lower separating tray and when the gas supply is renewed, the liquid drains downward out of the lock, wherein the lower separating tray has a tray that can be mounted so as to be fixed and has at least one opening, and a rotatable tray which is connected to a rotatable axle that is conducted through the tray that can be mounted so as to be fixed, in such a manner that the rotatable tray can be turned in relation to the tray that can be mounted so as to be fixed, wherein the rotatable tray is designed in such a manner that the at least one opening in the tray that can be mounted so as to be fixed is closed in a first position of the rotatable tray and can be opened by turning the rotatable tray.

In one embodiment of the invention, the upper and lower separating trays comprise a tray which can be mounted so as to be fixed and has at least one opening, and a rotatable tray which is connected to a rotatable axle that is conducted through the tray that can be mounted so as to be fixed. In this case, the opening in the tray that can be mounted so as to be fixed of the upper separating tray is open in the first position of the rotatable tray of the lower separating tray, and by turning the rotatable tray the opening having a sieve insert is closed, in such a manner that gas can flow through the sieve insert and the opening, but no liquid flows through the opening into the lock when the rotatable tray of the lower separating tray is in a position in which the opening in the tray that can be mounted so as to be fixed of the lower separating tray is open.

Alternatively, it is also possible to design the upper separating tray as a fixed tray in such a manner that in the case of a gas flow, no liquid drains from the tray and the liquid drains from the upper separating tray as soon as the gas flow is interrupted. Suitable forms for the upper separating tray are, for example, sieve trays.

By using the rotatable trays, it is possible to dispense with the use of additional valves which can stick and thereby can restrict the functioning of the column. In addition, the separating trays can be produced in a considerably less complex manner.

As gas/liquid mass-transfer process in the context of the present invention are termed all mass-transfer processes that are carried out in columns having suitable internals, usually trays, in which a liquid is intensively mixed with the gas and, generally, the liquid flows downward owing to gravity and the gas flows upward in the opposite direction in the column. Such gas/liquid mass-transfer processes are, for example, distillation, rectification, absorption or stripping (desorption). In addition to these separation processes, chemical reactions are further to be understood thereby in which at least one raw material stream is in the gaseous state and one raw material stream is in the liquid state. The expression "gas", in the context of the present invention, is to be taken to mean all gaseous substances, in particular also vapor.

In a preferred embodiment, the upper and lower separating trays which border the lock comprise two trays that can be mounted so as to be fixed, wherein the rotatable tray is positioned between the trays that can be mounted so as to be fixed. By the use of two trays which can be mounted so as to be fixed, between which the rotatable tray is positioned, the structure of the separating tray, in particular in the case of a rotatable tray situated on the lower tray that can be mounted so as to be fixed, acts as a labyrinth seal, in such a manner that, in particular, when the mass-transfer process is interrupted, no liquid can drain out of the lock.

If only one tray that can be mounted so as to be fixed is used, the rotatable tray can be positioned above or below the tray that can be mounted so as to be fixed. Preferably, the rotatable tray in this case is positioned above the tray that can be mounted so as to be fixed. However, particularly preferred is the arrangement having two trays that can be mounted so as to be fixed, between which is received the rotatable tray.

In order to permit a gas flow in the column during the mass-transfer process, at least one sieve insert is received in the rotatable tray of the upper separating tray, which sieve insert permits gas flow through the tray and is designed in such a manner that, owing to the gas flow, no liquid can drain off through the sieve tray. The number of sieve inserts in the rotatable tray of the upper separating tray corresponds in this case preferably to the number of openings in the tray that can be mounted so as to be fixed. This permits gas to be able to flow, during the mass-transfer process, through all openings in the tray that can be mounted so as to be fixed, and permits no opening to be open in such a manner that liquid can drain therethrough.

In addition, the sieve insert is designed in such a manner that it does not prevent a rotation of the rotatable tray of the upper separating tray. Preferably, the sieve insert has at most the same thickness as the rotatable tray. In one embodiment, the rotatable tray of the upper separating tray has two trays between which the at least one sieve insert is clamped. Alternatively, it is also possible to insert the sieve insert in each case into a corresponding opening in the rotatable tray. The fastening of the sieve insert can then be made to be detachable, for example by unscrewing, or non-detachable, for example by welding or gluing.

In order to ensure for each opening in the tray that can be mounted so as to be fixed that said opening is open in a first position and closed by a sieve insert in a second position of the rotatable tray, in the rotatable tray, preferably, openings and sieve inserts are arranged alternately, in such a manner that either the opening of the rotatable tray coincides with the opening of the tray that can be mounted so as to be fixed, or the sieve insert lies at the position of the opening of the tray that can be mounted so as to be fixed.

As sieve insert in the rotatable tray of the upper separating tray, any insert having a defined reduction of the cross section through which flow passes can be used. A suitable reduction of the cross section through which flow passes can be achieved, for example, by introducing holes having any desired cross-sectional shape, for example circular, elliptical, oval, as a slot, or a ring gap. In addition, the use of a sieve is also possible.

When the sieve insert is a perforated metal sheet, the holes are preferably dimensioned in such a manner that the gas flow during operation of the column is sufficient to keep the liquid on the upper separating tray.

Alternatively, it is also possible to equip the sieve insert with valves that open when a gas flows from below against the sieve insert and that close when no gas flows. In this case, it is possible to use all valves that are used in columns for separating trays and that can be dimensioned in such a manner that the valves do not prevent the rotary motion of the rotatable tray.

In a particularly preferred embodiment, all rotatable trays are connected to a shared rotatable axle, wherein the rotatable trays are arranged in each case in such a manner that when an opening of the lower separating tray is open, the opening of the upper separating tray is closed by the sieve insert, and when an opening of the upper separating tray is open, the opening of the lower separating tray is closed. The shared rotatable axle permits a simple operation of the column. In addition, it is possible thereby to actuate the rotatable trays of all locks simultaneously with only one drive, and thereby ensure reliable operation of the column. There is no risk that, owing to a defective drive, only one tray does not close and that the cyclic operation is thereby prevented. In addition, it is possible to arrange the drive outside the column with only one passageway for an axle.

Alternatively, for the drive, with a central shaft, it is also possible to drive the rotatable trays from outside the column at the outer diameter of the trays. For this purpose, for example, a single drive for each rotatable tray can be effected via pistons in tangential ports on the column.

Preferably, the rotatable tray has at least one opening which, to open the opening in the trays that can be mounted so as to be fixed, is brought into the position of the opening of the trays that can be mounted so as to be fixed. Via the opening in the rotatable tray, the opening in the tray that can be mounted so as to be fixed may be opened and closed in a simple manner. To open it, the opening in the rotatable tray is turned to the position in which the opening in the tray that can be mounted so as to be fixed is situated. To close it, the opening of the rotatable tray is brought into a position at which there is no opening in the tray that can be mounted so as to be fixed. In the case of the upper separating trays, in this case, the sieve insert is then brought into the region of the opening of the tray that can be mounted so as to be fixed.

The at least one opening in the rotatable tray is preferably designed in such a manner that the complete opening in the tray that can be mounted so as to be fixed is cleared when the rotatable tray is brought into the position in which the opening in the tray that can be mounted so as to be fixed is open. By way of this design of the openings in the rotatable tray, in the open state, the greatest possible cross-sectional opening is permitted, and so the pressure drop can also be decreased thereby.

To permit uniform flow through the column, it is further preferred if the trays that can be mounted so as to be fixed and the rotatable trays each have at least two openings, wherein it is particularly preferred when the openings in the trays that can be mounted so as to be fixed and in the rotatable trays are arranged centrically symmetrically about the center point. Via the circular symmetric arrangement around the center point, the openings are arranged uniformly distributed on the separating tray. The axle to which the rotatable trays are connected is preferably conducted through the center point.

In order to ensure that the openings in the trays that can be mounted so as to be fixed can be completely closed, the cross-sectional area of all openings on a tray that can be mounted so as to be fixed is less than 50% of the cross-sectional area of the tray. A cross-sectional opening of approximately 50% of the cross-sectional area of the tray, however, is only possible if the openings are designed in the form of circular segments. In the event of a differing form of the openings, the cross-sectional opening is correspondingly smaller.

If in each case at least the rotatable tray of the lower separating tray and the rotatable tray of the upper separating tray are mounted on a shared axle, the trays are arranged in relation to one another in such a manner that, in a first position of the axle, the openings in the trays that can be mounted so as to be fixed of the lower separating tray are open and the openings in the trays that can be mounted so as to be fixed of the upper separating tray are closed by the sieve insert and, in a second position of the axle, the openings in the tray that can be mounted so as to be fixed of the lower separating tray are closed, and the openings in the tray that is mounted so as to be fixed of the upper separating tray are open.

It is additionally preferred when the trays that are mounted so as to be fixed of the upper and the lower separating tray, in particular all separating trays, are of identical design. Alternatively, it is also possible, in each case to design the trays that are mounted so as to be fixed of a lock identically, wherein each lock has differently designed trays that are mounted so as to be fixed. This can be expedient, for example, if, in the lower region or else the upper region of the column, a larger cross-sectional opening is desired owing to a higher gas rate. Owing to the different sizes of cross-sectional openings, the pressure drop over the column can also be adjusted.

In running operation during the mass-transfer process, the rotatable trays are respectively in the position in which the openings in the lower separating tray are open and those in the upper separating tray are closed by the sieve inserts. Gas flows through the column from bottom to top and on the upper separating trays there is situated a liquid through which the gas is passed. On account of the gas flow, the liquid remains on the upper separating trays and does not run into the lock.

After a predetermined time, the rotatable trays are placed in the second position in such a manner that the openings in the lower separating tray are closed and the openings in the upper separating tray are open. As a result, at the same time, the gas flow is interrupted, in such a manner that the liquid is no longer retained on the upper separating tray and flows into the lock. In addition, the gas supply can also be interrupted from the outside.

In the case of rectification or stripping, it is possible, for example, to interrupt the gas supply by evaporator and condenser being separated off from the column by synchronized valves, preferably synchronized quick-closing valves. In this manner, the gas phase is confined in the column. The pressure difference between the bottom of the column and the top of the column that has built up during the time of contact of the gas with the liquid then equilibrates. By condensing out the vapors in the condenser, a reduced pressure is formed. It is preferred that the supply of the heating medium to the evaporator is not interrupted. This leads to the vapor pressure increasing in the evaporator. In order to avoid excessively high pressure fluctuations and thus possible mechanical damage to the column internals, the vapor is preferably temporarily stored in a buffer vessel that is external or integrated into the evaporator. The volume of this buffer vessel depends in this case on the time for which the gas supply to the column is interrupted. In this case, in addition, the switching delay may be taken into consideration. The volume of the buffer vessel in this case is preferably designed in such a manner that the maximum pressure in the buffer vessel does not exceed twice the operating pressure at the bottom of the column.

In order to restart the gas supply, the synchronized valves on the evaporator and condenser are reopened. During opening of the valves, firstly a vapor stream from the column into the condenser is formed, and at the same time, vapor flows at a high impulse into the column, owing to the pressure that is built up from the buffer vessel.

If the mass-transfer process carried out in the column is an absorption, the same method is applied. In this case, however, the synchronized valves ensure that the pressure equilibration and therefore the overflow time are achieved as rapidly as possible.

In a next step, the rotatable trays are again put into the first position and simultaneously the gas supply is restarted. The motion of the rotatable trays then opens the openings in the lower separating trays in such a manner that the liquid can drain out from the lock. By way of the start of gas supply and closing of the openings in the upper separating trays, the liquid in each case remains on the upper separating tray, which lies below the lock in which the liquid has arrived previously, and the mass-transfer process can be continued. The liquid from the lowest lock passes into the bottom of the column and can be withdrawn therefrom.

An exemplary embodiment of the invention is presented in the figures and is described in more detail in the description hereinafter.

Figure 1:
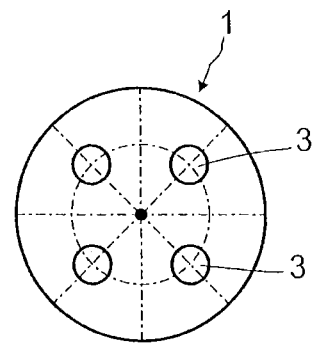
FIG. 1 shows a tray that can be mounted so as to be fixed in plan view.

In FIG. 1, a tray that can be mounted so as to be fixed is shown in plan view.

A tray 1 that can be mounted so as to be fixed has a cross section which corresponds to the cross section of a column. Since columns usually have a circular cross section, the cross section of the tray 1 that can be mounted so as to be fixed and is shown here is likewise circular. In addition to a circular tray 1 that can be mounted so as to be fixed, however, it is also possible that the tray 1 that can be mounted so as to be fixed assumes any desired other cross section which corresponds to the cross section of the column used.

In the tray 1 that can be mounted so as to be fixed, openings 3 are received, through which gas or liquid, depending on the operating state of the column, can flow.

The stationary trays 1 for an upper separating tray or a lower separating tray of a lock are preferably designed so as to be identical.

Figure 2:
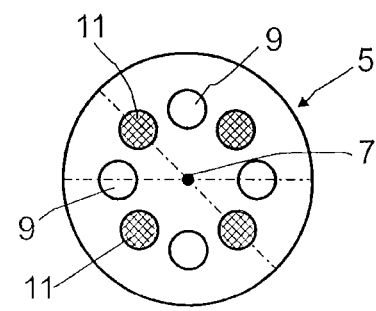
FIG. 2 shows a rotatable tray for an upper separating tray in plan view.

FIG. 2 presents a rotatable tray for an upper separating tray in plan view.

A rotatable tray 5 for an upper separating tray is preferably designed so as to be circular, in order that it is freely rotatable within the column. For this purpose, the rotatable tray 5 is connected to an axle at its center point 7.

The rotatable tray 5 for the upper separating tray has openings 9 that are positioned like the openings 3 in the tray 1 that can be mounted so as to be fixed. It is possible thereby that an opening of the upper separating tray is effected when the rotatable tray 5 of the upper separating tray is positioned in such a manner that the openings 9 in the rotatable tray 5 coincide with the openings 3 in tray 1 that can be mounted so as to be fixed, in such a manner that liquid can drain through these openings.

In addition to the openings 9, the rotatable tray 5 also has sieve inserts 11 for the upper separating tray. The sieve inserts 11 are positioned, in this case, in such a manner that in one position of the rotatable tray 5, the openings 3 in the tray 1 that can be mounted so as to be fixed are closed by the sieve inserts 11.

Figure 3:
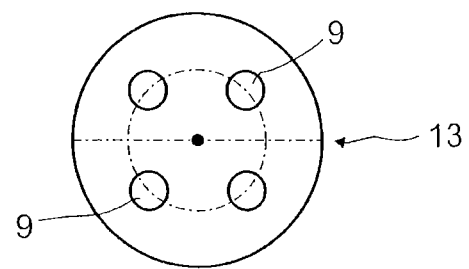
FIG. 3 shows a rotatable tray for a lower separating tray in plan view.

FIG. 3 shows a rotatable tray for a lower separating tray in plan view.

A rotatable tray 13 for a lower separating tray differs from the rotatable tray 5 for an upper separating tray in that it has only openings 9, but no sieve inserts 11. In a first position of the rotatable tray 13 for the lower separating tray, the openings 9 coincide with the openings 3 in the tray 1 that can be mounted so as to be fixed in such a manner that gas or liquid can flow through. In a second position, the rotatable tray 13 for the lower separating tray is twisted in relation to the tray 1 that can be mounted so as to be fixed, in such a manner that the openings 9 in the rotatable tray 13 of the lower separating tray and the openings 3 in the tray 1 that can be mounted so as to be fixed do no overlap. The lower separating tray is closed thereby.

In addition to the embodiment shown here having circular shaped openings 3 in the tray 1 that can be mounted so as to be fixed, circular shaped openings 9 in the rotatable trays 5, 13 and circular shaped sieve inserts 11, it is also possible to form the openings 3, 9 and sieve inserts 11 in any desired other shape, for example in the shape of a circular segment. In this case, it must be taken into account in each case that the openings 3 in the tray 1 that can be mounted so as to be fixed and the openings 9 in the rotatable tray 13 and the openings 9 and sieve inserts 11 in the rotatable tray 5 are arranged in such a manner that, by turning the rotatable trays 5, 13, the openings in the tray 1 that can be mounted so as to be fixed can be opened or closed, wherein the openings 3 in the tray 1 that can be mounted so as to be fixed of the upper separating tray 17 are closed by the sieve inserts 11. It is possible in this case to design the openings 3 and 9 and the sieve inserts 11 with the same geometry or else differently. Preferably, the openings 3 in the tray 1 that can be mounted so as to be fixed, the openings 9 in the rotatable trays 5, 13, and the sieve inserts, have the same geometry.

Figure 4:
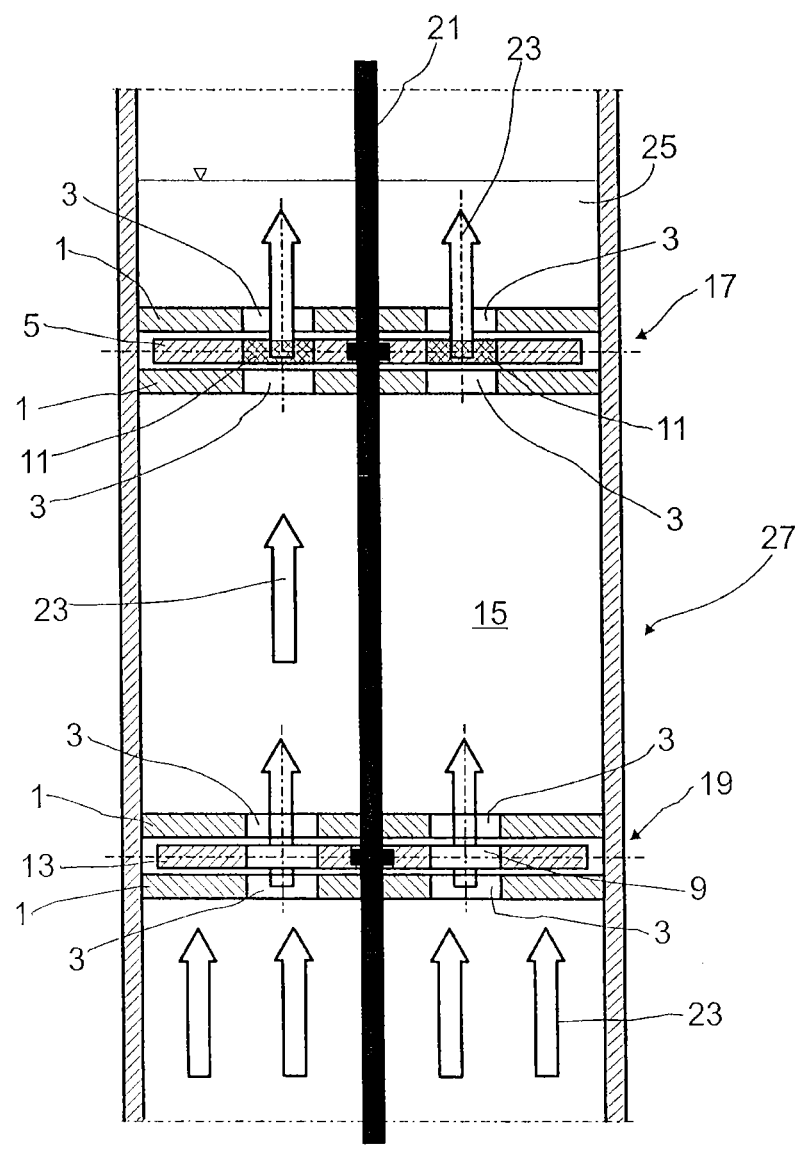
FIG. 4 shows a section through a lock in a column during the mass-transfer process.

FIG. 4 shows a lock in a column during the mass-transfer process.

A lock 15 comprises an upper separating tray 17 and a lower separating tray 19.

In the embodiment shown here, both the upper separating tray 17 and the lower separating tray 19 each have two trays 1 that can be mounted so as to be fixed, between which in each case a rotatable tray 5, 13 is received. By using two trays 1 that can be mounted so as to be fixed per separating tray 17, 19, the rotatable tray 5 for the upper separating tray 17 and the rotatable tray 13 for the lower separating tray 19 are retained at the respective position. The trays 1 that can be mounted so as to be fixed are in this case orientated for each separating tray 17, 19 in such a manner that the openings 3 in each case lie at the same position.

The rotatable tray 5 for the upper separating tray 17 and the rotatable tray 13 for the lower separating tray 19 are fixed to an axle 21 in such a manner that by rotating the axle 21 the rotatable trays 5, 13 can be turned with respect to the trays 1 that can be mounted so as to be fixed.

During the mass-transfer process shown in FIG. 4, the rotatable tray 13 for the lower separating tray is positioned in such a manner that the openings 9 in the rotatable tray 13 for the lower separating tray 19 are at the same position as the openings 3 in the trays 1 that can be mounted so as to be fixed. By way of this position of the rotatable tray 13 for the lower separating tray 19, gas can flow through the openings 3, 9 into the lock 15. The gas flow in this case is shown by arrows 23.

The rotatable tray 5 of the upper separating tray 17 is positioned in such a manner that the sieve inserts 11 each lie at the position of the openings 13 in trays 1 that can be mounted so as to be fixed. The sieve inserts 11 in this case are designed in such a manner that, owing to the gas flow 23, gas can flow upward through the upper separating tray 17, but no liquid 25 that lies on the upper separating tray 17 can drain into the lock 15 through the openings 3 and the sieve inserts 11. As sieve inserts 11, all inserts having a defined reduction of the cross section through which flow passes can be used. Suitable sieve inserts 11 are, for example, designed as perforated metal sheets. Further alternative designs for the sieve inserts 11 are, for example, slots, ring gaps or sieves.

The liquid is prevented in this case by the gas flowing through the sieve inserts 11 from flowing off through the sieve inserts 11.

The gas flowing through the openings 3 in the trays 1 that can be mounted so as to be fixed and the sieve inserts 11 in the rotatable tray 5 for the upper separating tray 17 flows into the liquid 25 on the upper separating tray 17 and is thus mixed with the liquid 25.

Depending on the mass-transfer process to be carried out, a plurality of locks 15 can be received in one column 27. The number of locks 15 corresponds in this case generally to the number of trays which are required for the mass-transfer process.

Figure 5:
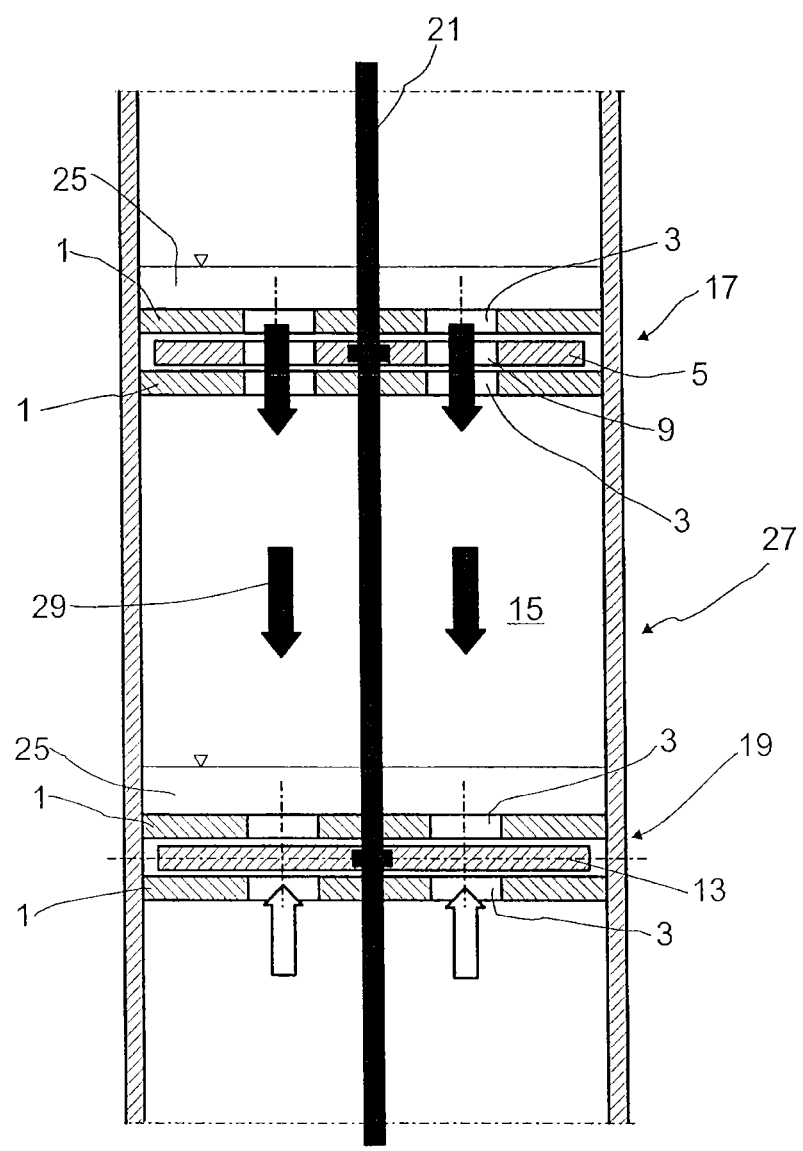
FIG. 5 shows a section through a lock in a column during interruption of the gas supply.
Figure 6:
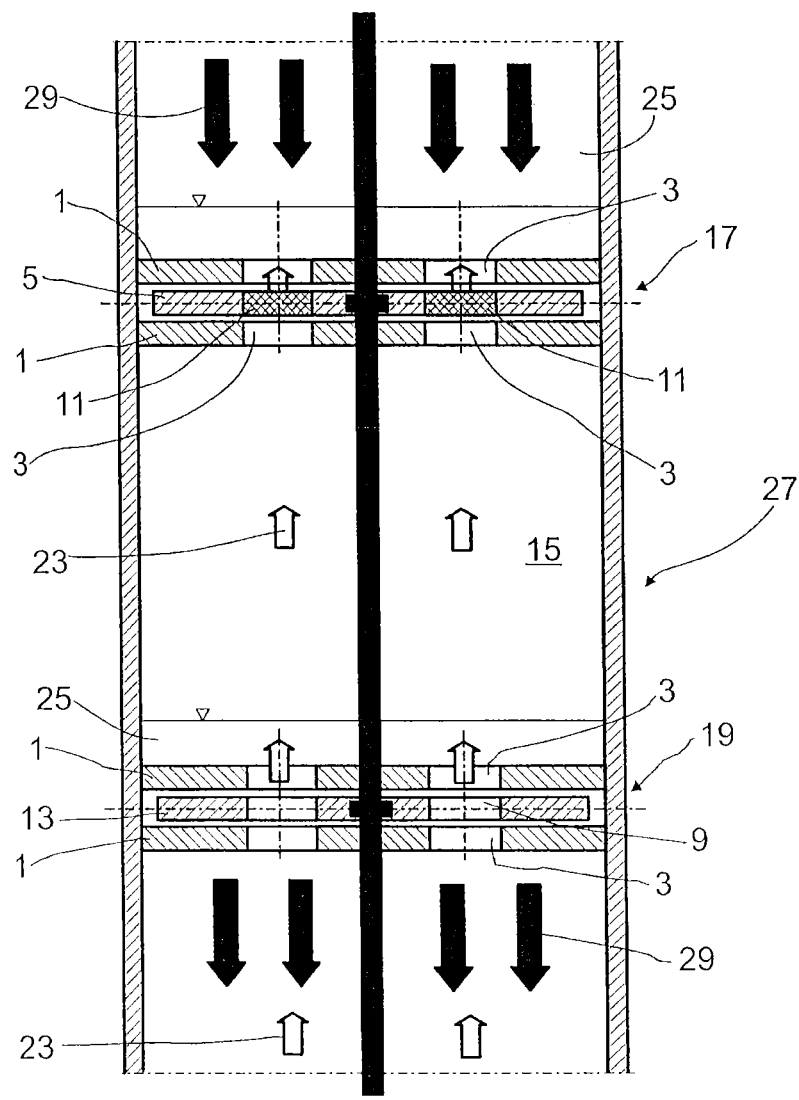
FIG. 6 shows a section through a lock in a column on restart of the gas flow.

A second step of the mass-transfer process which can be carried out in the column 27 is shown in FIG. 5.

In the method step shown in FIG. 5, the rotatable trays 5, 13 have been turned into a second position. The position of the rotatable trays 5, 13 is now such that, in the lower separating tray 19, the openings 3 of the trays 1 that can be mounted so as to be fixed are closed. This is achieved, as already described above, in that the openings 9 in the rotatable tray 13 of the lower separating tray 19 are turned to a position in which these openings 9 do not overlap with the openings 3 in the tray 1 that can be mounted so as to be fixed. The lock 15 is closed in this manner on the lower separating tray 19. This also leads to the fact that gas can no longer enter into the lock 15. The gas supply through the column 27 is thus likewise interrupted.

By turning the rotatable trays 13 of the lower separating tray 19, at the same time, also the rotatable trays 5 of the upper separating tray 17 are turned, since these are mounted in the embodiment shown here on a shared axle 21. The turning of the axle 21 brings the rotatable tray 5 of the upper separating tray 17 into a position in which the openings 9 coincide with the openings 3 of the trays 1 that can be mounted so as to be fixed. Owing to the interruption of the gas supply and the coincidence of the openings 9 of the rotatable tray 5 of the upper separating tray 17 with the openings 3 of the trays 1 that can be mounted so as to be fixed, the liquid previously on the upper tray 17 drains through the openings 3, 9 into the lock 15. Since the openings 3 in the lower separating tray 19 are closed by the rotatable tray 13 of the lower separating tray 19, the liquid remains in the lock 15. The entry of the liquid 25 into the lock 15 is shown by arrows 29.

In a next step, the axle 21 is turned further, in such a manner that the rotatable trays 5, 13 are brought back into their original position. Hereby, again, the openings 3 of the trays 1 that can be mounted so as to be fixed of the lower separating tray 19 are opened by coincidence with the openings 9 in the rotatable tray 13 of the lower separating tray 19, in such a manner that gas or liquid can flow through these openings. At the same time, the sieve inserts 11 of the rotatable tray 5 of the upper separating tray 17 are again brought into coincidence with the openings 3 of the trays 1 that can be mounted so as to be fixed of the upper separating tray 17. By way of the corresponding position of the rotatable tray 13 of the lower separating tray 19, the liquid 25 drains out of the lock 15. At the same time, the gas supply is restarted, and so a gas flow 23 which is directed upward in the column occurs. The gas flows through the sieve inserts 11 of the rotatable tray 5 of the upper separating tray 17, in such a manner that liquid that drains out of a lock 15 lying thereabove remains on the upper separating tray. Renewed mass transfer can then be carried out. Via the use of the lock 15 and draining of the liquid 25 from an upper separating tray 17, first into the lock 15 and not restarting the gas supply until after draining all of the liquid from an upper separating tray 17 into the lock 15, leads to no back mixing occurring during the mass-transfer process. The efficiency of the mass-transfer process can be improved in this manner.

LIST OF REFERENCE SIGNS

1 Tray that can be mounted so as to be fixed
3 Opening
5 Rotatable tray for an upper separating tray
7 Center point
9 Opening
11 Sieve insert
13 Rotatable tray for a lower separating tray
15 Lock
17 Upper separating tray
19 Lower separating tray
21 Axle
23 Gas flow
25 Liquid
27 Column
29 Liquid flow

The invention claimed is:

1. A column for carrying out gas/liquid mass-transfer processes, wherein, in the column (27), at least one lock (15) bordered by an upper separating tray (17) and a lower separating tray (19) is received, which lock is designed in such a manner that, during the mass-transfer process, gas (23) flows through the lock (15) and a liquid (25) situated on the upper separating tray (17), when the gas supply is interrupted the liquid (25) flows into the lock (15) onto the lower separating tray (19) and when the gas supply is renewed, the liquid (25) drains downward out of the lock (15), wherein the lower separating tray (19) has a tray (1) that can be mounted so as to be fixed and has at least one opening (3), and a rotatable tray (13) which is connected to a rotatable axle (21) that is conducted through the tray (1) that can be mounted so as to be fixed, in such a manner that the rotatable tray (13) can be turned in relation to the tray (1) that can be mounted so as to be fixed, wherein the rotatable tray (13) is designed in such a manner that the at least one opening (3) in the tray (1) that can be mounted so as to be fixed is closed in a first position of the rotatable tray (13) and can be opened by turning the rotatable tray (13).

2. The column according to claim 1, wherein the upper and lower separating trays (17; 19) comprise a tray (1) which can be mounted so as to be fixed and has at least one opening (3), and a rotatable tray (5; 13) which is connected to a rotatable axle (21) that is conducted through the tray (1) that can be mounted so as to be fixed, wherein the opening (3) in the tray (1) that can be mounted so as to be fixed of the upper separating tray (17) is open in the first position of the rotatable tray (13) of the lower separating tray (19), and by turning the rotatable tray (5) of the upper separating tray (17) having a sieve insert (11) is closed, in such a manner that gas can flow through the sieve insert (11) and the opening (3), but no liquid flows through the opening (3) into the lock (15) when the rotatable tray (13) of the lower separating tray (19) is in a position in which the opening (3) in the tray (1) that can be mounted so as to be fixed of the lower separating tray (19) is open.

3. The column according to claim 1, wherein the upper separating tray (17) is designed as a fixed tray in such a manner that in the case of a gas flow, no liquid drains from the tray and the liquid drains from the upper separating tray (17) as soon as the gas flow is interrupted.

4. The column according to claim 1, wherein the upper and/or lower separating tray (17; 19) comprises two trays (1) that can be mounted so as to be fixed, wherein the rotatable tray (5; 13) is positioned between the trays (1) that can be mounted so as to be fixed.

5. The column according to claim 2, wherein the sieve insert (11) in the rotatable tray (5) of the upper separating tray (17) is an insert having a defined reduction of the cross section through which flow passes.

6. The column according to claim 1, wherein all rotatable trays (5; 13) are connected to a shared rotatable axle (21), wherein the rotatable trays (5; 13) are arranged in each case in such a manner that when an opening (3) of the tray (1) that can be mounted so as to be fixed of the lower separating tray (19) is open, the opening (3) of the tray (1) that can be mounted so as to be fixed of the upper separating tray (17) having the sieve insert (11) is closed and when an opening (3) of the tray (1) that can be mounted so as to be fixed of the upper separating tray (17) is open, the opening (3) of the tray (1) that can be mounted so as to be fixed of the lower separating tray (19) is closed.

7. The column according to claim 1, wherein the rotatable tray (5; 13) has at least one opening (9) which, to open the opening (3) in the trays (1) that can be mounted so as to be fixed, is brought into the position of the opening (3) of the trays (1) that can be mounted so as to be fixed.

8. The column according to claim 7, wherein the at least one opening (9) in the rotatable tray (5; 13) is designed in such a manner that the complete opening (3) in the tray (1) that can be mounted so as to be fixed is cleared when the rotatable tray (5; 13) is brought into the position in which the opening (3) in the tray (1) that can be mounted so as to be fixed is open.

9. The column according to claim 7, wherein the trays (1) that can be mounted so as to be fixed and the rotatable trays (5; 13) each have at least two openings (9).

10. The column according to claim 7, wherein the openings (3) in the trays (1) that can be mounted so as to be fixed and in the rotatable trays (5; 13) are arranged centrically symmetrically about the center point (7).

11. The column according to claim 1, wherein the cross-sectional area of all openings (3) on a tray (1) that can be mounted so as to be fixed is less than 50% of the cross-sectional area of the tray (1).

* * * * *